(12) United States Patent
He

(10) Patent No.: US 7,974,594 B2
(45) Date of Patent: Jul. 5, 2011

(54) METHOD FOR CHECKING CONNECTIVITY BETWEEN BASE STATION CONTROLLER AND MOBILE SWITCHING CENTER

(75) Inventor: Jiecheng He, Shenzhen (CN)

(73) Assignee: Huawei Technologies Co., Ltd., Shenzhen, P.R. (CN)

( * ) Notice: Subject to any disclaimer, the term of this patent is extended or adjusted under 35 U.S.C. 154(b) by 0 days.

(21) Appl. No.: 11/872,103

(22) Filed: Oct. 15, 2007

(65) Prior Publication Data

US 2010/0255789 A1   Oct. 7, 2010

Related U.S. Application Data

(63) Continuation of application No. PCT/CN2006/001726, filed on Jul. 17, 2006.

(30) Foreign Application Priority Data

Aug. 23, 2005  (CN) .......................... 2005 1 0036814

(51) Int. Cl.
    *H03C 1/62* (2006.01)
(52) U.S. Cl. .................. 455/115.1; 455/115.2; 455/439; 370/249; 370/326; 370/328; 370/224; 370/242
(58) Field of Classification Search .................. 455/423, 455/439, 115.2
    See application file for complete search history.

(56) References Cited

U.S. PATENT DOCUMENTS

| | | | |
|---|---|---|---|
| 6,154,448 A | 11/2000 | Petersen et al. | |
| 6,826,156 B1 | 11/2004 | Sutton et al. | |
| 2006/0089146 A1 | 4/2006 | Gazzard | |
| 2006/0245368 A1* | 11/2006 | Ladden et al. ................ | 370/248 |

FOREIGN PATENT DOCUMENTS

| | | |
|---|---|---|
| CN | 1257371 | 6/2000 |
| CN | 1300511 A | 6/2001 |
| CN | 1444410 A | 9/2003 |
| CN | 1596001 | 3/2005 |
| CN | 100426909 C | 10/2008 |
| JP | 2002171569 | 6/2002 |
| KR | 2001-0091090 | 10/2001 |

OTHER PUBLICATIONS

International Search Report-PCT/CN2006/001726-mailed Nov. 9, 2006.
European Search Report dated Feb. 22, 2008 for application No./Patent No. 06761462.8-2412 PCT/CN2006001726.
Written Opinion of the International Searching Authority mailed Nov. 9, 2006.

* cited by examiner

*Primary Examiner* — Charles N Appiah
*Assistant Examiner* — Randy Peaches
(74) *Attorney, Agent, or Firm* — Slater & Matsil, L.L.P.

(57) ABSTRACT

The present invention relates to a method for checking connectivity between a BSC (Base Station Controller) and an MSC (Mobile Switching Center), including: the MSC loopbacking a circuit and sending a connectivity check command to the BSC to instruct the BSC to perform the connectivity check; the BSC performing the connectivity check according to the connectivity check command; if the connectivity check is successful, the BSC sends a Connectivity Check Success identifier to the MSC to instruct the MSC to cancel the self-loop of the circuit; if the connectivity check fails, the BSC sends a Clear Request message to the MSC to release the communication connection and cancel the self-loop of the circuit. Embodiments of the present invention implement quick and convenient locating of connection errors by adding a Connectivity Check command in the messages for A-interface.

18 Claims, 3 Drawing Sheets

METHOD FOR CHECKING CONNECTIVITY BETWEEN BASE STATION CONTROLLER AND MOBILE SWITCHING CENTER

The present application is a continuation of PCT application PCT/CN2006/001726, filed on Jun. 17, 2006, entitled "CONNECTING DETECTION METHOD IN CALLING PROCEDURE BETWEEN BSC AND MSC", which is incorporated by reference herein in its entirety.

FIELD OF THE INVENTION

The present invention relates to communication technology, and more specifically to a method for checking connectivity between a BSC (base station controller) and an MSC (mobile switching center) during a calling process.

BACKGROUND OF THE INVENTION

In a communication process, trunk line butting interconnection errors (including cross-connected lines and loopback) in TUP (Telephone User Part) or ISUP (Integrated Services Digital Network User Part) results in cross talk, mono-directional connect, and bidirectional disconnect, etc. in sessions. Usually, the trunk errors need to be located with methods such as loopback, pulling E1, or specifying a circuit for Call-Testing.

However, in TDM (Time Division Multiplexing) A-interface circuits, errors may only be checked with methods including loopback, pulling E1 and specifying a circuit for a Call-Testing. Suppose that there are 10 E1 lines between two NEs (network elements), the 10 E1 interfaces (No. 1-10) of NE A need to connect to the 10 E1 interfaces (No. 1-10) of NE B; first, the person responsible for the maintenance of NE B performs "loopback" or "pulling/plugging E1" for E1 interface 1, making the E1 connection "disconnected" or "connected"; then, the person responsible for the maintenance of NE A checks whether a corresponding E1 "disconnected" or "connected" occurs at E1 interface 1 of NE A, to determine whether the E1 connection is correct. All E1 ports are checked by repeating the process. If the "specifying a circuit for Call-Testing" method is used, the person responsible for maintenance may perform actual Call-Testing after E1 is connected, and make the call occupy the channel for testing E1 by the function of "specifying Call-Testing; and if the session is normal, it shows that the E1 connection is correct.

It is apparent that the above solutions are troublesome and may not locate circuit errors quickly and conveniently; therefore, the maintenance cost is increased.

SUMMARY OF THE INVENTION

An embodiment of the present invention provides a method for checking connectivity between a BSC (base station controller) and an MSC (mobile switching center) during a calling process to overcome the problems in the prior art, such as circuit errors may not be located quickly and conveniently.

The present invention provides a method for checking connectivity between a BSC and an MSC during a calling process, including:

(a) the MSC loopbacking a circuit and sending a Connectivity Check command to a BSC; and (b) the BSC performing connectivity check according to the Connectivity Check command; if the connectivity check is successful, the BSC sending a Connectivity Check Success identifier to the MSC to instruct the MSC to cancel the self-loop of the circuit; if the connectivity check fails, the BSC sending a Clear Request message to the MSC to release communication connection and cancel the self-loop of the circuit.

In the method for checking connectivity between a BSC and an MSC during calling process according to an embodiment of the present invention, in the step (a), the MSC sends the Connectivity Check command to the BSC by sending an Assignment Request message containing a Connectivity Check command.

In the method for checking connectivity between a BSC and an MSC during a calling process according to an embodiment of the present invention, in the step (b), the BSC sends the a Connectivity Check Success identifier to the MSC by sending an Assignment Completion message containing the Connectivity Check Success identifier.

The method for checking connectivity between a BSC and an MSC during a calling process according to an embodiment of the present invention further includes: the BSC sending a request message with a connectivity check identifier to the MSC to instruct the MSC to perform the connectivity check.

In the method for checking connectivity between a BSC and an MSC during a calling process according to an embodiment of the present invention, the BSC is a BSC at calling side, the MSC is an MSC at calling side, and the request message with a connectivity check identifier is a CM service request message; or, the BSC is a BSC at called side, the MSC is an MSC at called side, and the request message with the connectivity check identifier is a paging response message.

In the method for checking connectivity between a BSC and an MSC during a calling process according to an embodiment of the present invention, a connectivity check is performed through the following steps:

(a1) the BSC sends a monotone to an outgoing channel of an outgoing circuit connected to the BSC; if the BSC receives the monotone in a return channel of the outgoing circuit connected to the BSC and transmission quality and implementation of the monotone meet the predefined requirement, it indicates that the connectivity check is successful; if the BSC does not receive the monotone in the return channel of the outgoing circuit connected to the BSC or the transmission quality and the implementation of received monotone does not meet the predefined requirement, it indicates that the connectivity check fails.

An embodiment of the present invention also provides a method for checking connectivity between a BSC and an MSC during a calling process, including the following steps:

(a) the MSC at calling side loopbacking a circuit, and sending a Connectivity Check command to the BSC at calling side;

(b) the BSC performing connectivity check according to the Connectivity Check command; if the connectivity check at calling side is successful, the BSC at calling side sending a Connectivity Check success identifier to the MSC at calling side to instruct the MSC at calling side to cancel the self-loop of the circuit and perform connectivity check at called side; if the connectivity check at calling side fails, the BSC at calling side sending a Clear Request message to the MSC at calling side to instruct the MSC at calling side to release the communication connection and cancel the self-loop of the circuit.

In the method for checking connectivity between a BSC and an MSC during a calling process according to an embodiment of the present invention, a connectivity check at called side is performed through the following steps:

(b1) the MSC at called side loopbacking the circuit, and sending a Connectivity Check Request command to the BSC at called side;

(b2) the BSC performing the connectivity check according to the Connectivity Check command; if the connectivity check at called side is successful, the BSC at called side sending a Connectivity Check Success identifier to the MSC at called side to instruct the MSC at called side to cancel the self-loop of the circuit; if the connectivity check fails, the BSC at called side sending a Clear Request message to the MSC at called side to instruct the MSC at called side to release the communication connection and cancel the self-loop of the circuit.

The method for checking connectivity between a BSC and an MSC during a calling process according to an embodiment of the present invention, further includes: before the MSC at calling side loopbacks the circuit, the BSC at calling side sending a CM service request message to the MSC at calling side; wherein, the CM service request message contains a connectivity check identifier.

The method, for checking connectivity between a BSC and an MSC during a calling process according to an embodiment of the present invention, further includes: before the MSC at called side loopbacks the circuit, the BSC at called side sending a paging response message to the MSC at called side; wherein, the paging response message contains a connectivity check identifier.

In the method for checking connectivity between a BSC and an MSC during a calling process according to an embodiment of the present invention, a connectivity check is performed through the following steps: the BSC sends a monotone to an outgoing channel of an outgoing circuit connected to the BSC; if the BSC receives the monotone in a return channel of the outgoing circuit connected to the BSC and transmission quality and implementation of the monotone meets the predefined requirement, it indicates that the connectivity check is successful; if the BSC does not receive the monotone in the return channel of the outgoing circuit connected to the BSC or the transmission quality and the implementation of the received monotone does not meet the predefined requirement, it indicates that the connectivity check fails.

The method for checking connectivity between a BSC and an MSC during a calling process according to an embodiment of the present invention implements quick and convenient locating of connection errors by adding a Connectivity Check command in the messages for A-interface, without changing the flow of the calling process.

BRIEF DESCRIPTION OF THE DRAWINGS

Hereinafter, detailed descriptions on certain embodiments of the present invention are provided with reference to the drawings, in which.

DETAILED DESCRIPTION OF THE EMBODIMENTS

Figure 1:
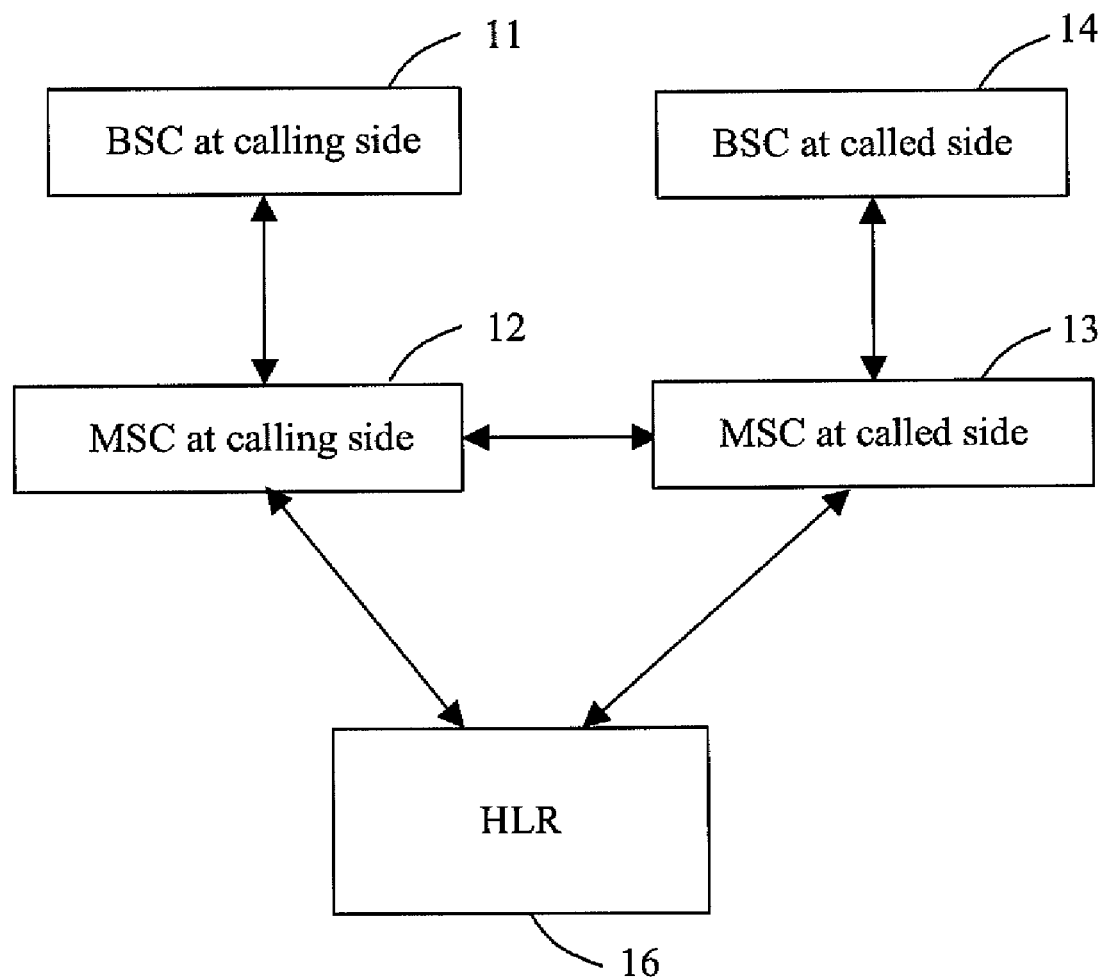
FIG. 1 is a schematic diagram showing a system architecture for implementing an embodiment of the present invention.

FIG. 1 shows system architecture for implementing the method for checking connectivity during a calling process according to an embodiment of the present invention. As shown in FIG. 1, the system includes: a plurality of BSCs (base station controllers) (only two are shown in the drawing, i.e., BSC 11 at calling side and BSC 14 at called side); a plurality of MSCs (mobile switching centers) (only two are shown in the drawing, i.e., MSC 12 at calling side and MSC 13 at called side); and an HLR (home location register) 16. Wherein, BSC 11 at calling side is connected to MSC 12 at calling side via A-interface; BSC 14 at called side is connected to MSC 13 at called side via A-interface; and MSC 12 at calling side is connected to MSC 13 at called side via B-interface. In addition, MSC 12 at calling side and MSC 13 at called side are connected to HLR 16 via C interface, respectively.

A BSC includes wireless transceiver, antenna, and relevant signal processing circuits, etc., and usually includes four major components: a CSC (Cell Site Controller), a VCC (voice channel controller), an SCC (signaling channel controller), and an EMPI (extended multi-path interface). The BSC is responsible for management of all communication interfaces, mainly including allocation, release, and management of wireless channels. An MSC is mainly used for communications control and management, such as channel management and allocation, call handling and control, control of cell switching and roaming, registration and management of subscriber location information, registration and management of subscriber numbers and mobile equipment numbers, service type control, subscriber authentication, connection to other MSCs in the system and provision of link interfaces to other public communication networks, for example, a PSTN (public switching telecommunication network), an ISDN (integrated service digital network), and a PDN (public data network), thus it is ensured that a seamless service is provided to the subscribers when the subscribers move or roam. An HLR is a database for storing local subscriber location information. In communication network, usually a plurality of HLRs are provided, and each subscriber may register to a certain HLR (corresponding to the home of the subscriber). The content of registration covers two aspects: one is permanent parameter, such as subscriber number, mobile equipment number, access priority, predefined service type, and security parameter etc.; and the other is temporary parameter which needs to be updated at any moment, in other words, parameters related to the current subscriber location.

A-interface standard defines all functional interfaces between a BS (base station) and an MSC (mobile switching center), including message interfaces and procedure, so that the BS and the MSC equipments from different equipment vendors may be interconnected seamlessly.

Figure 2:
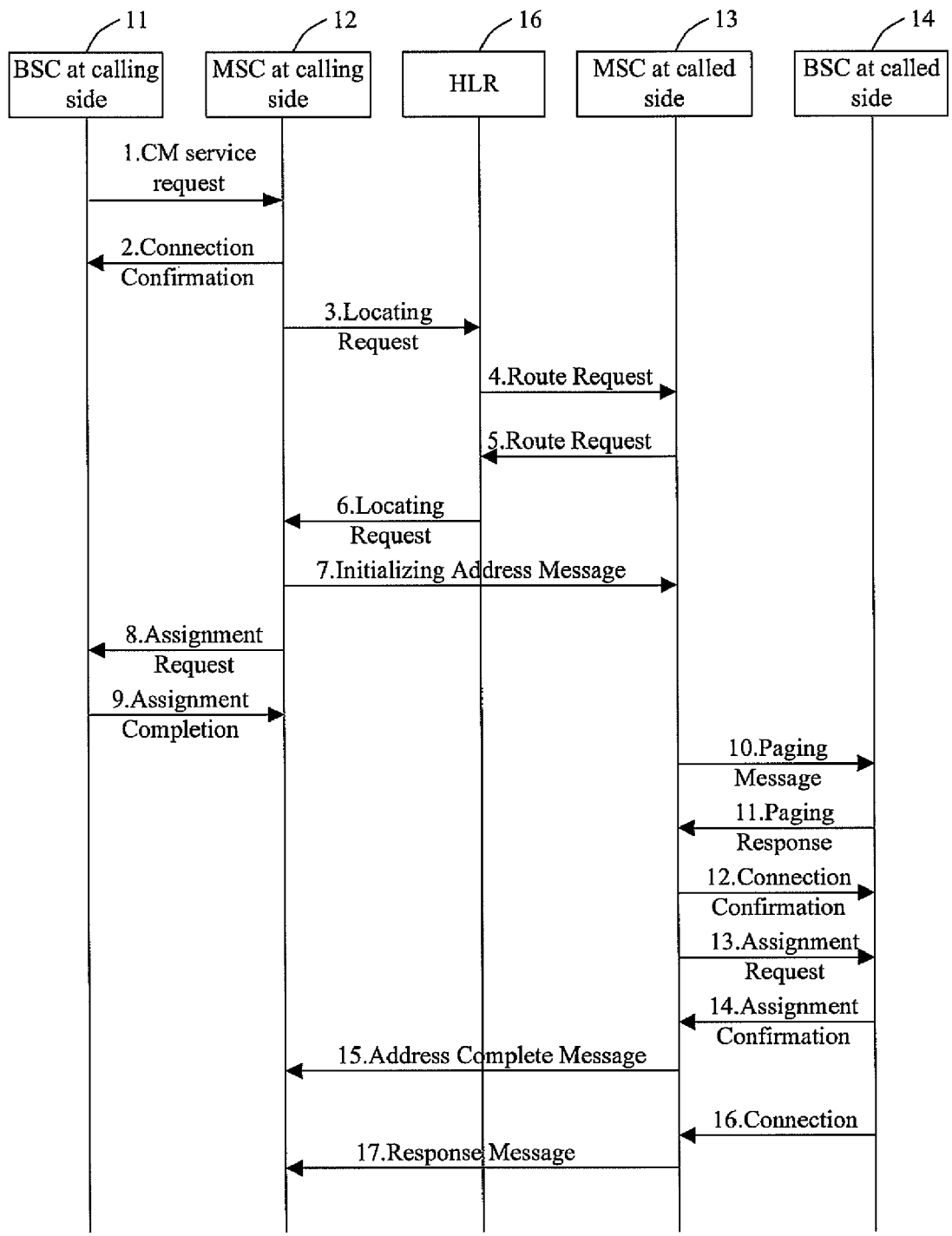
FIG. 2 is a schematic diagram showing a calling flow according to an embodiment of the present invention.
Figure 3:
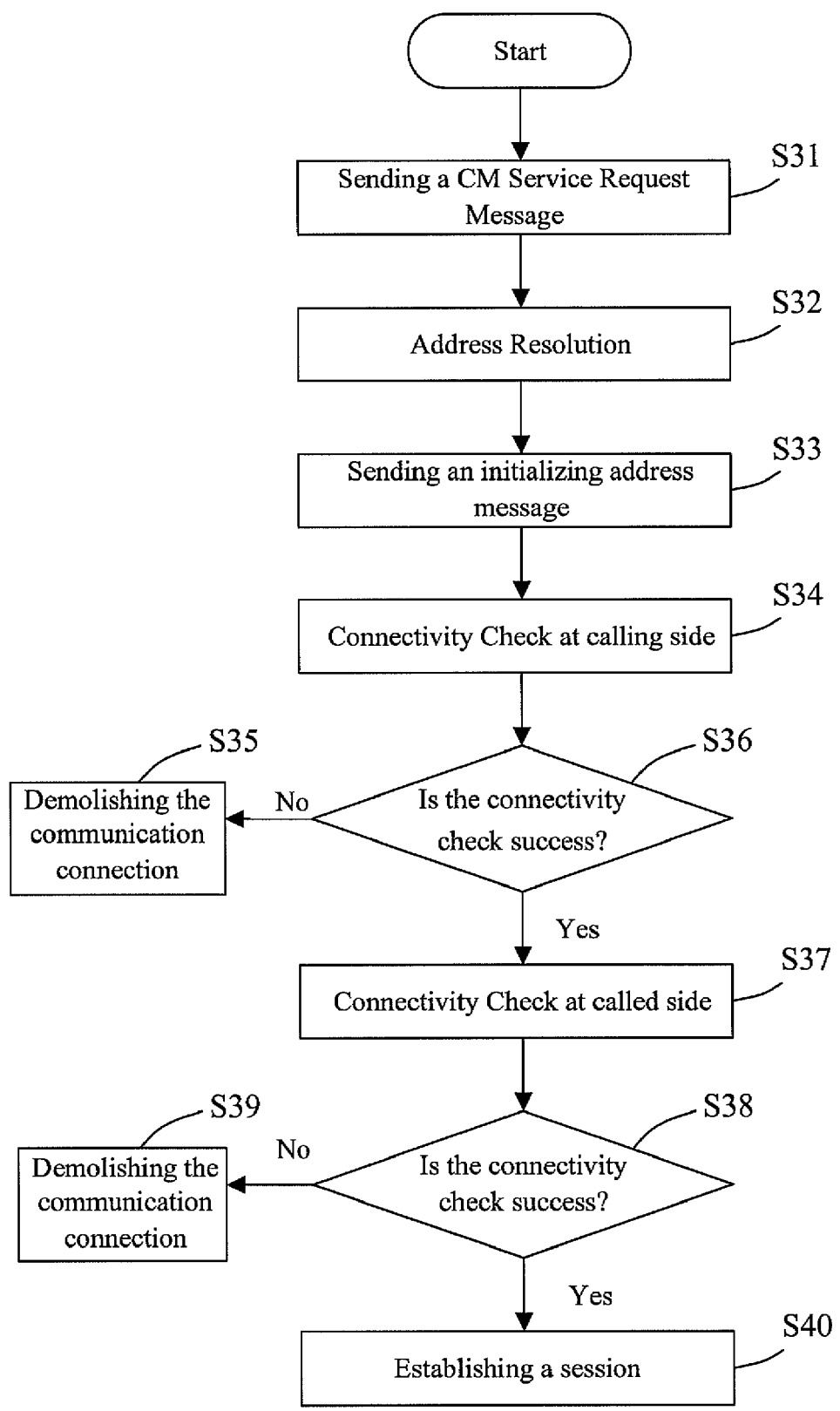
FIG. 3 is a flow chart showing the method for checking connectivity during the calling process shown in FIG. 2.

FIG. 2 and FIG. 3 show the flow of the method for checking connectivity during a calling process according to an embodiment of the present invention. On the basis of the existing calling process, the connectivity check between a BSC and an MSC is implemented by adding a Connectivity Check command in the messages transmitted between the BSC and the MSC, and therefore errors (such as cross-connected lines and loopback etc.) in communication connections may be located quickly and conveniently.

Hereinafter, the present invention is described in an example of calling process, suppose that the BSC 11 and MSC 12 at calling side are the calling side while the MSC 13 and BSC 14 at called side are the called side, and signaling between MSC 12 at calling side and MSC 13 at called side is ISUP (Integrated Services Digital Network User Part) (in actual applications, SIP-T or BICC protocol, or even H.323 protocol may also be used as interoffice signaling between MSCs).

First, BSC 11 at calling side sends a CM service request message (CM SERV REQ) to MSC 12 at calling side, wherein the CM SERV REQ message contains a Connectivity Check identifier, which may be set as a parameter in the CM SERV REQ message; MSC 12 at calling side creates a Connectivity Check command according to the Connectivity Check identifier to instruct BSC 11 at calling side to perform connectivity check during the calling process; then, MSC 12 at calling side returns a Connection Confirmation (CC) message to BSC 11 at calling side (step S31).

Next, the communication network subsystem performs address analysis (step S32), which includes the following steps: MSC 12 at calling side sends a locating request message (LOC REQ) to HLR 16; and HLR 16 sends a route request message (ROUTE REQ) to MSC 13 at called side; MSC 13 at called side returns a route request response message containing the temporary local number of the called party to HLR 16; then, HLR 16 returns a locating request message to MSC 12 at calling side to notify the calling party the location of called party.

After the address resolution, MSC 12 at calling side sends an initializing address message (IAM) to BSC 13 at called side.

Next, the connectivity check at calling side is performed: MSC 12 at calling side loopbacks the circuit and sends an assignment request message (ASSIGNMENT REQ) containing a Connectivity Check command to BSC 11 at calling side to instruct BSC 11 at calling side to perform connectivity check (step S34) and determines whether the connectivity check is successful (step S36).

In this embodiment, the connectivity check and determination at calling side includes the following steps: BSC 11 at calling side sends a monotone to the outgoing channel of the outgoing circuit connected to BSC 11. If the connectivity check fails, i.e., BSC 11 at calling side does not receive the above monotone in the return channel of outgoing circuit connected to BSC 11 or the transmission quality and implementation of the received monotone do not meet the predefined requirement (see Standard Q.724), then BSC 11 at calling side sends a clear request message (CLEAR REQ) to MSC 12 at calling side to release the communication connection and instruct MSC 12 at calling side to cancel the self-loop of the circuit (step S35); if the connectivity check is successful, i.e., BSC 11 at calling side receives the monotone in the return channel of outgoing circuit connected to BSC 11 and the transmission quality and implementation of the monotone meet the predefined requirement (see Standard Q.724), then BSC 11 at calling side returns an assignment completion message (ASSIGNMENT CMP) containing a connectivity check success identifier (e.g., as a parameter in the message) to MSC 12 at calling side to instruct the MSC at calling side to cancel the self-loop of the circuit.

Then, the connectivity check at called side begins (step S37), and determines whether the connectivity check is successful (step S38).

In this embodiment, the connectivity check and determination at called side includes the following steps: MSC 13 at called side sends a paging message (PAGING) to BSC 14 at called side; then BSC 14 at called side returns a paging response containing a connectivity check identifier (e.g., as a parameter in the paging response message) to MSC 13 at called side to instruct it to perform connectivity check; while MSC 13 at called side returns a connection confirmation message (CC) to BSC 14 at called side. MSC 13 at called side loopbacks the circuit, and then sends an assignment request message (ASSIGNMENT REQ) containing a connectivity check command (e.g., as a parameter in the message) to BSC 14 at called side, and the connectivity check command instructs BSC 14 at called side to perform a connectivity check; the connectivity check process is similar to the one performed at calling side. If the connectivity check fails, BSC 14 at called side sends a clear request message (CLEAR REQ) to MSC 13 at called side to release the communication connection and cancel the self-loop (step S39); if the connectivity check is successful, BSC 14 at called side returns an assignment completion message (ASSIGNMENT CMP) containing a connectivity check success identifier (e.g., as a parameter in the message) to MSC 13 at called side to instruct MSC 13 at called side to cancel the self-loop of the circuit.

If the connectivity check at called side is successful, the system establishes a session as follows: MSC 13 at called side returns an ACM (address complete message) to MSC 12 at calling side; then, BSC 14 at called side sends a Connect message to MSC 13 at called side; finally, MSC 13 at called side sends a Response message to MSC 12 at calling side (step S40).

In this way, a call from BSC 11 at calling side to BSC 14 at called side is completed; at the same time, the connectivity check between a BSC and an MSC is also completed during a calling process. It should be noted that the connectivity check at calling side is independent of the connectivity check at called side; therefore, the connectivity check at any side may be used separately in a system.

The present invention implements the connectivity check during a calling process via A-interface without changing the flow of the calling process, by extending the contents of CM SERV REQ message, ASSIGNMENT REQ message, PAGING message (or PAGING RESPONSE message), and ASSIGNMENT CMP in A-interface protocol.

While the present invention has been illustrated and described with reference to some preferred embodiments, the present invention is not limited to these. Those skilled in the art should recognize that various variations and modifications may be made within the spirit and scope of the present invention as defined by the accompanying claims.

What is claimed is:

1. A method for checking connectivity between a Base Station Controller and a Mobile Switching Center during a calling process, the method comprising:

loopbacking, by a Mobile Switching Center, a circuit and sending a Connectivity Check command to a Base Station Controller;

performing, by the Base Station Controller, a connectivity check according to the Connectivity Check command;

if the connectivity check is successful, the Base Station Controller sending a Connectivity Check Success identifier to the Mobile Switching Center to instruct the Mobile Switching Center to cancel a self-loop of the circuit;

if the connectivity check fails, the Base Station Controller sending a Clear Request message to the Mobile Switching Center to instruct the Mobile Switching Center to release communication connection and cancel the self-loop of the circuit; and sending, by the Base Station Controller, a request message with a Connectivity Check identifier to the Mobile Switching Center to instruct the Mobile Switching Center to perform the connectivity check;

wherein the Base Station Controller is a Base Station Controller at calling side;

wherein the Mobile Switching Center is a Mobile Switching Center at calling side; and wherein the request message with the Connectivity Check identifier comprises a CM service request message.

2. The method according to claim 1, wherein the Mobile Switching Center sends the Connectivity Check command to the Base Station Controller by sending an Assignment Request message containing the Connectivity Check command.

3. The method according to claim 2, wherein performing the connectivity check comprises:
sending a monotone from the Base Station Controller to an outgoing channel of an outgoing circuit connected to the Base Station Controller;
if the Base Station Controller receives the monotone in a return channel of the outgoing circuit connected to the Base Station Controller and transmission quality and implementation of the monotone meets a predefined requirement, indicating that the connectivity check is successful; and
if the Base Station Controller does not receive the monotone in the return channel of the outgoing circuit connected to the Base Station Controller or the transmission quality and the implementation of received monotone does not meet a predefined requirement, indicating that the connectivity check fails.

4. The method according to claim 1, wherein the Base Station Controller sends the Connectivity Check Success identifier to the Mobile Switching Center by sending an Assignment Completion message containing the Connectivity Check Success identifier.

5. The method according to claim 4, wherein performing the connectivity check comprises:
sending a monotone from the Base Station Controller to an outgoing channel of an outgoing circuit connected to the Base Station Controller;
if the Base Station Controller receives the monotone in a return channel of the outgoing circuit connected to the Base Station Controller and transmission quality and implementation of the monotone meets a predefined requirement, indicating that the connectivity check is successful; and
if the Base Station Controller does not receive the monotone in the return channel of the outgoing circuit connected to the Base Station Controller or the transmission quality and the implementation of received monotone does not meet a predefined requirement, indicating that the connectivity check fails.

6. The method according to claim 1, wherein performing the connectivity check comprises:
the Base Station Controller sending a monotone to an outgoing channel of an outgoing circuit connected to the Base Station Controller;
if the Base Station Controller receives the monotone in a return channel of the outgoing circuit connected to the Base Station Controller and transmission quality and implementation of the monotone meets a predefined requirement, indicating that the connectivity check is successful; and
if the Base Station Controller does not receive the monotone in the return channel of the outgoing circuit connected to the Base Station Controller or the transmission quality and the implementation of received monotone does not meet a predefined requirement, indicating that the connectivity check fails.

7. A method for checking connectivity between a Base Station Controller and a Mobile Switching Center during calling process, the method comprising:
sending a CM service request message containing a Connectivity Check identifier from a Base Station Controller at a calling side to a Mobile Switching Center at the calling side;
after sending the CM service request message, loopbacking a circuit and sending a Connectivity Check command, from the Mobile Switching Center at the calling side to a Base Station Controller at the calling side;
performing, by the Base Station Controller at the calling side, a connectivity check according to the Connectivity Check command; and
if the connectivity check at calling side is successful, sending a Connectivity Check success identifier to the Mobile Switching Center at calling side to instruct the Mobile Switching Center at calling side to cancel a self-loop of the circuit and perform a connectivity check at called side; and
if the connectivity check at calling side fails, sending a Clear Request message to the Mobile Switching Center at calling side to instruct the Mobile Switching Center at calling side to release a communication connection and cancel the self-loop of the circuit.

8. The method according to claim 7, wherein performing the connectivity check comprises:
loopbacking the circuit and sending a Connectivity Check command from the Mobile Switching Center at called side to the Base Station Controller at called side;
performing, by the Base Station Controller at the called side, the connectivity check according to the Connectivity Check command;
if the connectivity check at called side is successful, sending a Connectivity Check Success identifier to the Mobile Switching Center at the called side to instruct the Mobile Switching Center at the called side to cancel the self-loop of the circuit; and
if the connectivity check fails, sending a Clear Request message to the Mobile Switching Center at the called side to instruct the Mobile Switching Center at the called side to release the communication connection and cancel the self-loop of the circuit.

9. The method according to claim 8, further comprising, before the Mobile Switching Center at called side loopbacks the circuit:
sending a paging response message containing the Connectivity Check identifier from the Base Station Controller at the called side to the Mobile Switching Center at the called side.

10. The method according to claim 9, wherein performing the connectivity check according to the Connectivity Check command and performing the connectivity check at the called side each comprise:
sending a monotone from the Base Station Controller to an outgoing channel of an outgoing circuit connected to the Base Station Controller;
if the Base Station Controller receives the monotone in a return channel of the outgoing circuit connected to the Base Station Controller and transmission quality and implementation of the monotone meet a predefined requirement, indicating that the connectivity check is successful; and
if the Base Station Controller does not receive the monotone in the return channel of the outgoing circuit connected to the Base Station Controller or the transmission quality and the implementation of the received monotone does not meet a predefined requirement, indicating that the connectivity check fails.

11. The method according to claim 8, wherein performing the connectivity check according to the Connectivity Check command and performing the connectivity check at the called side each comprise:

sending a monotone from the Base Station Controller to an outgoing channel of an outgoing circuit connected to the Base Station Controller;

if the Base Station Controller receives the monotone in a return channel of the outgoing circuit connected to the Base Station Controller and transmission quality and implementation of the monotone meet a predefined requirement, indicating that the connectivity check is successful; and if the Base Station Controller does not receive the monotone in the return channel of the outgoing circuit connected to the Base Station Controller or the transmission quality and the implementation of the received monotone does not meet a predefined requirement, indicating that the connectivity check fails.

12. The method according to claim 7, wherein performing the connectivity check according to the Connectivity Check command and performing the connectivity check at the called side each comprise:

sending a monotone from the Base Station Controller to an outgoing channel of an outgoing circuit connected to the Base Station Controller;

if the Base Station Controller receives the monotone in a return channel of the outgoing circuit connected to the Base Station Controller and transmission quality and implementation of the monotone meet a predefined requirement, indicating that the connectivity check is successful; and if the Base Station Controller does not receive the monotone in the return channel of the outgoing circuit connected to the Base Station Controller or the transmission quality and the implementation of the received monotone does not meet a predefined requirement, indicating that the connectivity check fails.

13. A method for checking connectivity between a Base Station Controller and a Mobile Switching Center during a calling process, the method comprising:

receiving a Connectivity Check command from a Mobile Switching Center at a Base Station Controller, the Connectivity Check command based on loopbacking a circuit by the Mobile Switching Center;

performing a connectivity check according to the Connectivity Check command;

if the connectivity check is successful, sending a Connectivity Check Success identifier from the Base Station Controller to the Mobile Switching Center to instruct the Mobile Switching Center to cancel a self-loop of the circuit;

if the connectivity check fails, sending a Clear Request message from the Base Station Controller to the Mobile Switching Center to instruct the Mobile Switching Center to release communication connection and cancel the self-loop of the circuit; and sending a request message with a Connectivity Check identifier from the Base Station Controller to the Mobile Switching Center to instruct the Mobile Switching Center to perform the connectivity check;

wherein the Base Station Controller is a Base Station Controller at calling side;

wherein the Mobile Switching Center is a Mobile Switching Center at calling side; and wherein the request message with the Connectivity Check identifier comprises a CM service request message.

14. The method according to claim 13, wherein receiving the Connectivity Check command comprises receiving an Assignment Request message containing the Connectivity Check command.

15. The method according to claim 14, wherein performing the connectivity check comprises:

sending a monotone from the Base Station Controller to an outgoing channel of an outgoing circuit connected to the Base Station Controller;

if the Base Station Controller receives the monotone in a return channel of the outgoing circuit connected to the Base Station Controller and transmission quality and implementation of the monotone meets a predefined requirement, indicating that the connectivity check is successful; and if the Base Station Controller does not receive the monotone in the return channel of the outgoing circuit connected to the Base Station Controller or the transmission quality and the implementation of received monotone does not meet a predefined requirement, indicating that the connectivity check fails.

16. The method according to claim 13, wherein sending the Connectivity Check Success identifier comprises sending an Assignment Completion message containing the Connectivity Check Success identifier.

17. The method according to claim 16, wherein performing the connectivity check comprises:

sending a monotone from the Base Station Controller to an outgoing channel of an outgoing circuit connected to the Base Station Controller;

if the Base Station Controller receives the monotone in a return channel of the outgoing circuit connected to the Base Station Controller and transmission quality and implementation of the monotone meets a predefined requirement, indicating that the connectivity check is successful; and if the Base Station Controller does not receive the monotone in the return channel of the outgoing circuit connected to the Base Station Controller or the transmission quality and the implementation of received monotone does not meet a predefined requirement, indicating that the connectivity check fails.

18. The method according to claim 13, wherein performing the connectivity check comprises:

sending a monotone from the Base Station Controller to an outgoing channel of an outgoing circuit connected to the Base Station Controller;

if the Base Station Controller receives the monotone in a return channel of the outgoing circuit connected to the Base Station Controller and transmission quality and implementation of the monotone meets a predefined requirement, indicating that the connectivity check is successful; and if the Base Station Controller does not receive the monotone in the return channel of the outgoing circuit connected to the Base Station Controller or the transmission quality and the implementation of received monotone does not meet a predefined requirement, indicating that the connectivity check fails.

* * * * *